United States Patent
Ornella et al.

(10) Patent No.: US 9,802,469 B2
(45) Date of Patent: Oct. 31, 2017

(54) HYBRID POWERMODE WITH SERIES HYBRID

(71) Applicant: DANA ITALIA SPA, Arco (IT)

(72) Inventors: Giulio Ornella, Arco (IT); Fabrizio Zendri, Rovereto (IT); Ettore Cosoli, Padua (IT); Donald Remboski, Ann Arbor, MI (US); Timothy Morscheck, Portage, MI (US); Lorenzo Serrao, Nago-Torbole (IT)

(73) Assignee: Dana Italia SPA, Arco (IT)

( * ) Notice: Subject to any disclaimer, the term of this patent is extended or adjusted under 35 U.S.C. 154(b) by 0 days.

(21) Appl. No.: 15/330,068

(22) PCT Filed: Feb. 3, 2015

(86) PCT No.: PCT/EP2015/052208
§ 371 (c)(1),
(2) Date: Aug. 2, 2016

(87) PCT Pub. No.: WO2015/117960
PCT Pub. Date: Aug. 13, 2015

(65) Prior Publication Data
US 2017/0072779 A1    Mar. 16, 2017

Related U.S. Application Data

(60) Provisional application No. 61/935,610, filed on Feb. 4, 2014.

(51) Int. Cl.
*B60K 6/12*     (2006.01)
*B60K 6/46*     (2007.10)
(Continued)

(52) U.S. Cl.
CPC ............... *B60K 6/12* (2013.01); *B60K 6/46* (2013.01); *B60W 10/04* (2013.01); *B60W 10/06* (2013.01);
(Continued)

(58) Field of Classification Search
CPC ... B60K 6/12; B60K 6/08; B60K 6/20; B60K 6/22
See application file for complete search history.

(56) References Cited

U.S. PATENT DOCUMENTS 4,760,697 A    8/1988   Heggie et al.
4,815,334 A    3/1989   Lexen
(Continued)

FOREIGN PATENT DOCUMENTS

DE    102006017581 A1    9/2007
DE    102006060014 B4    5/2009
(Continued)

OTHER PUBLICATIONS

European Patent Office, The International Search Report and Written Opinion in PCT/EP2015/052208, dated May 5, 2015, 9 pages, European Patent Office, Rijswijk, The Netherlands.

*Primary Examiner* — John Walters
*Assistant Examiner* — James Triggs
(74) *Attorney, Agent, or Firm* — Marshall & Melhorn, LLC

(57) ABSTRACT

A series hydraulic hybrid driveline for a vehicle is described. The driveline has a power source, a hydraulic circuit having a first hydraulic displacement unit and a second hydraulic displacement unit, a hydraulic accumulator assembly with high pressure and low pressure hydraulic accumulators, at least one accumulator valve, at least one input device, and a control unit. The first hydraulic displacement unit is drivingly engaged with the power source. The accumulator
(Continued)

assembly is selectively fluidly connected to the hydraulic circuit through the accumulator valve. The control unit is configured to compute a total power requested from the power source based on an input command from the input device, compare the computed total power to a threshold power, and control a valve state of the accumulator valve based upon the result of the comparison. A method of controlling the driveline is also described.

16 Claims, 4 Drawing Sheets

(51) Int. Cl.
| | |
|---|---|
| *B60W 10/04* | (2006.01) |
| *B60W 10/06* | (2006.01) |
| *B60W 10/08* | (2006.01) |
| *B60W 10/24* | (2006.01) |
| *B60W 20/00* | (2016.01) |
| *B60W 30/18* | (2012.01) |
| *B60W 20/19* | (2016.01) |
| *B60W 20/15* | (2016.01) |

(52) U.S. Cl.
CPC ............ *B60W 10/08* (2013.01); *B60W 10/24* (2013.01); *B60W 20/00* (2013.01); *B60W 20/15* (2016.01); *B60W 20/19* (2016.01); *B60W 30/18127* (2013.01); *B60W 2540/10* (2013.01); *B60W 2540/12* (2013.01); *B60Y 2200/22* (2013.01); *B60Y 2200/41* (2013.01); *B60Y 2300/69* (2013.01); *Y02T 10/6208* (2013.01); *Y02T 10/6282* (2013.01)

(56) References Cited

U.S. PATENT DOCUMENTS

| | | | |
|---|---|---|---|
| 5,518,461 A | 5/1996 | Pfordt | |
| 5,579,640 A | 12/1996 | Gray, Jr. et al. | |
| 5,887,674 A | 3/1999 | Gray, Jr. | |
| 6,719,080 B1 | 4/2004 | Gray, Jr. | |
| 7,147,078 B2* | 12/2006 | Teslak | B60K 6/12 180/305 |
| 7,870,727 B2 | 1/2011 | Mueller et al. | |
| 7,926,265 B2 | 4/2011 | Mueller et al. | |
| 7,934,779 B2* | 5/2011 | Kodama | B60K 6/44 303/115.3 |
| 7,984,783 B2 | 7/2011 | Gray, Jr. et al. | |
| 8,108,111 B2 | 1/2012 | Stein et al. | |
| 8,162,094 B2 | 4/2012 | Gray, Jr. et al. | |
| 8,616,323 B1 | 12/2013 | Gurin | |
| 8,959,905 B2 | 2/2015 | Baltes et al. | |
| 8,991,167 B2 | 3/2015 | Yuan et al. | |
| 9,032,723 B2 | 5/2015 | Haugen | |
| 9,057,389 B2 | 6/2015 | Opdenbosch | |
| 2004/0251067 A1 | 12/2004 | Gray, Jr. et al. | |
| 2006/0243515 A1 | 11/2006 | Okada et al. | |
| 2011/0314801 A1 | 12/2011 | Baltes et al. | |
| 2012/0090308 A1 | 4/2012 | Yuan et al. | |
| 2012/0178570 A1 | 7/2012 | Gray, Jr. et al. | |
| 2012/0233991 A1 | 9/2012 | Ivantysynova et al. | |
| 2012/0240564 A1 | 9/2012 | Wesolowski et al. | |
| 2013/0081385 A1 | 4/2013 | Opdenbosch | |
| 2013/0133318 A1 | 5/2013 | Vogl et al. | |
| 2015/0113969 A1* | 4/2015 | Kochhan | B60K 6/12 60/327 |

FOREIGN PATENT DOCUMENTS

| | | |
|---|---|---|
| DE | 102009056153 A1 | 6/2011 |
| DE | 102011005356 A1 | 9/2012 |
| DE | 102011055178 A1 | 5/2013 |
| EP | 0615077 A1 | 9/1994 |
| EP | 1963686 B1 | 10/2011 |
| FR | 2971741 A1 | 8/2013 |
| WO | 9634213 A1 | 10/1996 |
| WO | 9713650 A1 | 4/1997 |
| WO | 0151870 A1 | 7/2001 |
| WO | 2007035997 A1 | 4/2007 |
| WO | 2008012558 A2 | 1/2008 |
| WO | 2010072299 A1 | 7/2010 |
| WO | 2011/112663 A2 | 9/2011 |
| WO | 2012125798 A1 | 9/2012 |
| WO | 2013121126 A1 | 8/2013 |
| WO | 2013/159851 A1 | 10/2013 |

\* cited by examiner

HYBRID POWERMODE WITH SERIES HYBRID

The present document claims priority from U.S. Provisional Patent App. No. 61/935,610 filed on Feb. 4, 2014, which is hereby incorporated by reference in its entirety.

BACKGROUND OF INVENTION

The invention primarily relates to a series hydraulic hybrid transmission system, in particular for automotive vehicles. More specifically, the invention relates to a series hydraulic hybrid transmission system including a hydraulic circuit, an accumulator assembly in fluid communication with the hydraulic circuit and a control unit for controlling the system. The invention further relates to a method of controlling the series hydraulic hybrid transmission system. Hydraulic hybrid transmission systems of this sort may find application in off-highway working machines used in agriculture, mining or construction, such as tractors, wheel loaders, wheeled excavators, backhoe loaders, telehandlers, dumpers, or the like.

Hydraulic hybrid transmission systems including a hydraulic circuit and one or more hydraulic accumulators for hydraulic energy storage are a known technology. Hydraulic energy recuperated by the accumulators may be re-injected in the system to replace or supplement a primary energy source, for example an internal combustion engine.

However, the fuel consumption and performance of a hydraulic hybrid transmission system depend to a great extent on the control strategy used for operating the vehicle and have remained a challenge for developers.

SUMMARY OF THE INVENTION

It is therefore an object of the present invention to develop a hydraulic hybrid system that provides improved vehicle performance and/or improved fuel efficiency.

This object is solved by a series hydraulic hybrid driveline for a vehicle, comprising:
  a power source;
  a hydraulic circuit comprising a first hydraulic displacement unit in fluid communication with a second hydraulic displacement unit, the first hydraulic displacement unit drivingly engaged or selectively drivingly engaged with the power source;
  at least one accumulator valve;
  an accumulator assembly comprising a high pressure hydraulic accumulator and a low pressure hydraulic accumulator, the accumulator assembly selectively fluidly connected to the hydraulic circuit through the accumulator valve;
  at least one input device; and
  a control unit;
wherein the control unit is configured and/or programmed to:
  compute, based on an input command from the input device, a total power requested from the power source;
  compare a power value of the computed total power requested from the power source (or total requested power for brevity) to at least one power threshold value; and
  control, based upon the result of the comparison, a valve state of the accumulator valve.

Due to the fact that the control unit is configured to control the valve state of the accumulator valve based on whether the requested power is above or below the at least one power threshold value, the power transmitted from the power source to the hydraulic circuit may be automatically supplemented or replaced by hydraulic power provided through the accumulator assembly according to current operating conditions and/or driver requests. Additionally or alternatively, the accumulators may be automatically recharged according to current operating conditions and/or driver requests. In this way, the driveline may be controlled in an energy-efficient manner while meeting the current driver requests.

The computation of the total requested power carried out by the control unit may further be based on a current vehicle status and/or on a current power source speed (measured in rpm). The vehicle status may include at least one of a vehicle speed, a direction of movement of the vehicle and a gear selection, for example. Within the scope of this document the formulation "at least one of $x_1, \ldots, x_n$," may comprise any subset of $x_1, \ldots, x_n$, including the complete set.

The valve state may be changed between an open state and a closed state. In the open state the accumulator valve allows a flow of hydraulic fluid between the hydraulic circuit and the accumulator assembly through the accumulator valve. In the closed state the accumulator valve prevents a flow of hydraulic fluid between the hydraulic circuit and the accumulator assembly through the accumulator valve.

The power source typically includes an engine such as an internal combustion engine or an electric engine.

The first hydraulic displacement unit may include a hydraulic pump. For example, the first hydraulic displacement unit may include a hydrostatic pump such as a hydrostatic radial piston pump or a hydrostatic axial piston pump. The first hydraulic displacement unit may have a variable hydraulic displacement. For example, the first hydraulic displacement unit may have a moveable swashplate or a bent-axis design.

The second hydraulic displacement unit may include one or more hydraulic motors. For example, the second hydraulic displacement unit may include a hydrostatic motor such as a hydrostatic radial piston motor or a hydrostatic axial piston motor. The second hydraulic displacement unit may have a variable hydraulic displacement. For example, the second hydraulic displacement unit may have a moveable swashplate or a bent-axis design. The second hydraulic displacement unit is usually drivingly engaged or selectively drivingly engaged with a vehicle output. The vehicle output may include at least one of a gearbox, a drive shaft, a vehicle axle, a final drive and one or more wheels, for example.

Usually, the first hydraulic displacement unit and the second hydraulic displacement unit each have a first fluid port and a second fluid port. The hydraulic circuit may include a first main fluid line fluidly connecting or selectively fluidly connecting the first fluid port of the first hydraulic displacement unit to the first fluid port of the second hydraulic displacement unit, and the hydraulic circuit may include a second main fluid line fluidly connecting or selectively fluidly connecting the second fluid port of the first hydraulic displacement unit to the second fluid port of the second hydraulic displacement unit. The hydraulic circuit may be a closed hydrostatic circuit including the first and the second hydraulic displacement unit and the first and the second main fluid line. The hydraulic circuit is typically sealed from the external environment. For example, a minimum hydraulic pressure in the hydraulic circuit may be at least 10 bar or at least 20 bar. The hydraulic circuit may further be configured for a maximum hydraulic pressure of at least 300 bar or at least 400 bar.

The control unit may be configured or programmed to repeatedly compute the requested power and to repeatedly compare the requested power to the threshold power. In this way, the valve state may be adjusted to current vehicle operating conditions and/or driver request with maximum speed and efficiency. For example, the control unit may be configured to carry out the computation and the comparison at least once within a sampling time interval of at most 500 ms, of at most 200 ms or of at most 100 ms. Also, it is conceivable that the control unit is configured to modulate the duration of the sampling time interval based on the computed requested power and on the threshold power. For example, the control unit may be configured to shorten the duration of the sampling time interval when the computed requested power falls within a predetermined power interval that includes the threshold power.

The input device may include an accelerator pedal. The input command may then include an acceleration command or a deceleration command. The input device may include a brake pedal. The input command may then include a brake command. For example, the input command may be correlated to an accelerator pedal position and/or to a brake pedal position. Vehicles having a hydrostatic transmission typically decelerate fast when the accelerator pedal is released. Therefore, pressing the brake pedal is often not required to decelerate the vehicle.

The driveline may further comprise a working hydraulics assembly. The working hydraulics assembly usually comprises a hydraulic working pump drivingly engaged or selectively drivingly engaged with the power source, and a hydraulic implement in fluid communication with the working pump. The hydraulic implement may include one ore more hydraulic cylinders and/or hydraulic motors, for example. The implement may be driven through the working pump by using the working pump to displace hydraulic fluid to/from the implement. The input device may then include a device for controlling the working hydraulics assembly and the input command may then include a working hydraulics control command.

The power threshold value may include a boost threshold value. The control unit may then be configured to change the valve state to the open state or to keep the valve state in the open state when the computed value of the total requested power is above the boost threshold value. The boost threshold may be a predetermined power value. For example, the boost threshold value may be the maximum power or a predetermined (typically high) percentage of the maximum power which the power source is capable of providing to the hydraulic circuit and/or the working assembly. That is, the control unit is adapted to open the accumulator valves and to fluidly connect the accumulators to the hydraulic circuit when the total requested power reaches or surpasses the boost threshold. By opening the accumulator valves, hydraulic energy stored in the accumulators may then be used to provide additional power to the hydraulic circuit, and in particular to the second hydraulic displacement unit.

Additionally or alternatively, the power threshold may include a recharge threshold. The control unit may then be configured to change the valve state to an open state or keep the valve state in the open state when the total requested power is below the recharge threshold or falls below the recharge threshold. The recharge threshold may be a predetermined power value. For example, the recharge threshold may be an absolute power value or a (typically low) percentage of the maximum power of the power source. The recharge threshold value is usually lower than the boost threshold value.

Depending on the input command and possibly on the vehicle status and/or on a state of charge of the accumulators, when the total requested power is or falls below the recharge threshold the control unit may open the accumulator valves to initiate regenerative braking. That is, the control unit may actuate the accumulator valves to fluidly connect the accumulators to the second hydraulic displacement unit in such a way that the second hydraulic displacement unit uses kinetic energy absorbed from the vehicle output to displace hydraulic fluid from the low pressure accumulator to the high pressure accumulator, thereby charging the accumulator assembly.

Further, depending on the input command and possibly on the vehicle status and/or on a state of charge of the accumulators, when the total requested power is or falls below the recharge threshold the control unit may open the accumulator valves to recharge the accumulators through the power source and the first hydraulic displacement unit. That is, the control unit may command the power source to drive the first hydraulic displacement unit so that the first hydraulic displacement unit displaces hydraulic fluid from the low pressure accumulator to the high pressure accumulator to charge the accumulator assembly.

When recharging the accumulators through the first hydraulic displacement unit in this way, the control unit may fluidly disconnect the second hydraulic displacement unit from the first hydraulic displacement unit and from the accumulators so that no energy is absorbed by the second hydraulic displacement unit and the recharging process does not interfere with the vehicle output. Additionally or alternatively, the control unit could set the hydraulic displacement of the second hydraulic displacement unit to zero displacement and/or the control unit could disengage the vehicle output from the second hydraulic displacement unit, for example by actuating a clutch. Of course, it is equally conceivable that the second hydraulic displacement unit remains fluidly connected to the first hydraulic displacement unit and the accumulators while the accumulators are recharged through the first hydraulic displacement unit as explained above.

The control unit may fluidly disconnect the second hydraulic displacement unit from the first hydraulic displacement unit and/or from the accumulators by closing one or more isolation valves. The isolation valves can be arranged along a fluid path between the second hydraulic displacement unit on the one hand and the accumulators and/or the first hydraulic displacement unit on the other hand, for example.

The control unit may be configured to change the valve state to a closed state or to keep the valve state in the closed state when the total requested power is below the boost threshold and above the recharge threshold.

The control unit may be configured and/or programmed to perform the following steps when the total requested power is above the boost threshold or is increased above the boost threshold:

compute, based on the input command from the at least one input device and based on the vehicle status, a requested torque to be provided at the output of the second hydraulic displacement unit;

compute, based on a state of charge of the accumulator assembly, a maximum accumulator torque available through the accumulator assembly; and compare the requested torque to the maximum accumulator torque.

The control unit may compute the maximum accumulator torque $T_{acc,max}$ according to the relation $T_{acc,max} = a \cdot \Delta p \cdot \alpha$, where $\Delta p = p_{HP} - p_{LP}$ is the pressure difference between the hydraulic pressures in the accumulators 4a, 4b, $\alpha$ is the hydraulic displacement of the motor 9 (limited by the maximum displacement) and "a" is a system-dependent constant typically including the efficiency of the motor 9 at maximum motor displacement.

The control unit may then further be configured and/or programmed to change the valve state to the open state or to keep the valve state in the open state when the total requested power is above the boost threshold and the maximum accumulator torque is larger than the requested torque. This ensures that there is enough hydraulic energy stored in the accumulators to meet the torque request. In this case, the control unit could command the power source to reduce its speed to reduce fuel consumption, for example.

In order to make this procedure even more efficient, the control unit may additionally be configured to repeatedly compute the requested torque and the maximum accumulator torque and to repeatedly compare the requested torque to the maximum accumulator torque.

The control unit may further be configured to disengage the first hydraulic displacement unit from the power source and/or to set a hydraulic displacement of the first hydraulic displacement unit to zero displacement, when the accumulator valve is in the open state, the total requested power is above the boost threshold and when the maximum accumulator torque is larger than the requested torque. That is, the control may be configured to decouple the power source from the second hydraulic displacement unit so that no energy is transmitted from the power source to the second hydraulic displacement unit. In this case the requested output torque is provided through the accumulator assembly only.

At the same time the control unit may command the power source to drive the working hydraulics assembly. In other words, when or as long as the total requested power is above the boost threshold and, simultaneously, the maximum accumulator torque is larger than the requested torque, the control unit may fluidly connect the accumulators to the hydraulic circuit, decouple the power source from the hydraulic circuit and command the power source to drive the working hydraulic assembly. In this situation all power available from the power source is used for driving the working hydraulics. At the same time the accumulators provide the necessary power to the second hydraulic displacement unit to meet the operator's output torque request.

Furthermore, a method of controlling the above described series hydraulic hybrid driveline is proposed. The method comprises at least the following steps:
  computing, based on an input command from the input device, a total power requested from the power source;
  comparing the computed total requested power to the at least one threshold power; and
  controlling, based upon the result of the comparison, a valve state of the accumulator valve.

The method may furthermore include one or more of the above described steps which the control unit is configured to perform.

BRIEF DESCRIPTION OF THE DRAWINGS

An embodiment of the presently proposed driveline is described in the following detailed description and is depicted in the accompanying drawing in which.

DETAILED DESCRIPTION OF THE INVENTION

It is understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
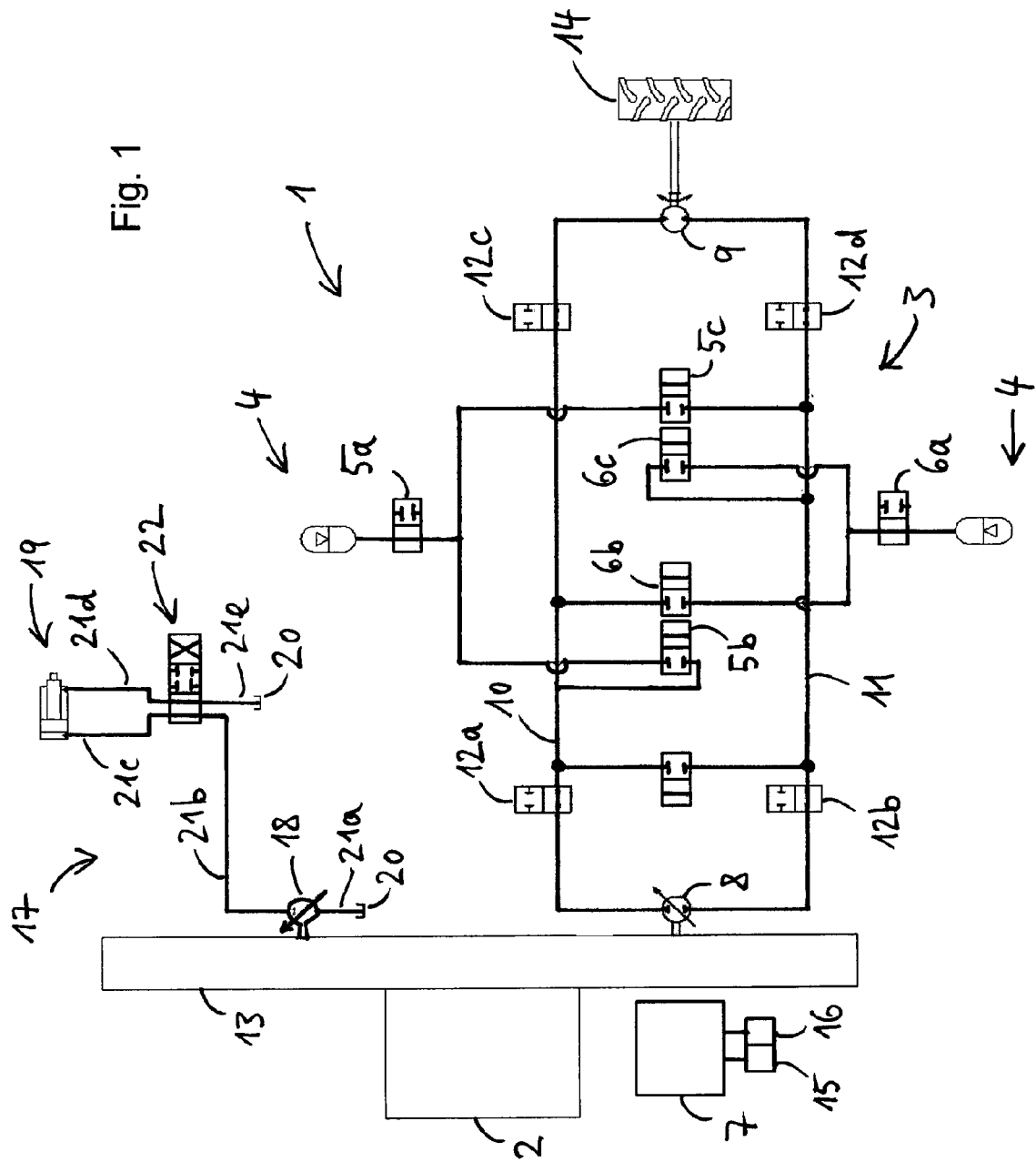
FIG. 1 shows a series hydraulic hybrid driveline.

FIG. 1 shows a series hydraulic hybrid driveline 1 of a front-end loader (not shown). The driveline 1 includes an internal combustion engine 2, a hydrostatic circuit 3, a hydraulic accumulator assembly 4, accumulator valves 5a-c, 6a-c, an electronic control unit 7, an accelerator pedal 15 and a joystick 16.

The hydrostatic circuit comprises a variable displacement hydrostatic axial piston pump 8, a variable displacement hydrostatic axial piston motor 9, a first main fluid line 10 and a second main fluid line 11. By opening 2/2-way shut-off valves 12a-d the hydrostatic circuit 3 can be closed so that the pump 8 and the motor 9 are fluidly connected through the main lines 10, 11. When the hydrostatic circuit 3 is closed, hydraulic fluid may be circulated through the pump 8, the motor 9 and the main lines 10, 11. The main lines 10, 11 comprise fluid pipes and/or tubes configured to withstand hydrostatic pressures up to a maximum pressure of at least 400 bar.

The pump 8 is selectively drivingly engaged with the engine 2 through a mechanical splitter box 13. That is, the splitter box 13 may be actuated to one of engage and disengage the engine 2 with the pump 8. When the splitter box 13 drivingly engages the engine 2 with the pump 8, the engine 2 may drive the pump 8 such that hydraulic fluid is circulated in the hydrostatic circuit 3, thereby driving the motor 9. The motor 9 is selectively drivingly engaged with a vehicle output 14 through a gearbox (not shown). The vehicle output may include at least one of a drive shaft, a vehicle axle, a final drive and one or more wheels.

The accumulator assembly 4 comprises a high pressure hydro-pneumatic bladder accumulator 4a and a low pressure hydro-pneumatic bladder accumulator 4b. The accumulators 4a, 4b are each configured as a hollow vessel comprising an elastic bladder disposed in the vessel. The bladder contains an inert gas such as nitrogen. Bladder accumulators of this type may be pressurized by filling or partially filling the accumulators with a hydraulic fluid such as oil. As hydraulic fluid enters the accumulator, the inert gas is compressed, thereby increasing the hydrostatic pressure in the accumulator. Similarly, the accumulator may be de-pressurized by letting the inert gas in the bladder expand, thereby displacing hydraulic fluid contained in the accumulator out of the accumulator and creating a fluid flow. The high pressure accumulator 4a is configured to withstand hydrostatic pressures up to a maximum pressure of at least 450 bar and the low pressure accumulator 4b is configured to withstand hydrostatic pressures up to a maximum pressure of at least 150 bar, for example.

The accumulators 4a, 4b are selectively fluidly connected to the main lines 10, 11 of the hydrostatic circuit 3 through the accumulator valves 5a-c, 6a-c. The accumulator valves 5*a-c*, 6*a-c* are configured as 2/2-way shut-off valves having an open position and a closed position, respectively. In the open position (see for example the valves 5*a*, 6*a* in FIG. 1) hydraulic fluid may flow through the shut-off valve, whereas in the closed position a flow of hydraulic flow through the shut-off valve is prevented.

As a skilled person readily understands from the schematic of FIG. 1, the valves 5*a-c*, 6*a-c* can be at least in a closed valve state, a first open valve state and a second open valve state. In the closed valve state, at least the valves 5*a*, 6*a* are closed, thereby fluidly disconnecting the accumulators 4*a*, 4*b* from the hydrostatic circuit 3. In the first open valve state, the valves 5*a*, 5*b*, 6*a*, 6*c* are open and the valves 5*c*, 6*b* are closed so that the accumulators 4*a*, 4*b* are fluidly connected to the main lines 10, 11, respectively. In the second open valve state, the valves 5*a*, 5*c*, 6*a*, 6*b* are open and the valves 5*b*, 6*c* are closed so that the accumulators 4*a*, 4*b* are fluidly connected to the main lines 11, 10, respectively.

The driveline 1 further includes a hydraulic working assembly 17. The working assembly 17 includes a hydraulic working pump 18, a hydraulic implement 19 and a fluid reservoir 20 which are in fluid communication with each other through fluid lines 21*a-e* and a 4/3-way directional control valve 22. The working pump 18 is selectively drivingly engaged with the engine 2 through the splitter box 13. The implement 19 includes at least one hydraulic cylinder and a hydraulic piston movably arranged within the cylinder. Here, the implement 19 is part of a lifting and tipping mechanism for lifting and tipping a bucket (not shown) of the front-end loader. That is, the working assembly 17 may be used to dig the bucket into a pile of material such as sand to fill the bucket, lift the filled bucket, tip the bucket to unload the material and again lower the bucket, for example.

To move the hydraulic piston of the implement 19 to perform the above described working hydraulics operations, the control valve may be switched to a proper spool position to fluidly connect the working pump 18, the implement 19 and the reservoir 20. The working pump 14 may then be driven through the engine 2 to displace hydraulic fluid from the reservoir 20 to the cylinder of the implement 19 to move the piston. At the same time, hydraulic fluid is displaced from the implement 19 to the reservoir. As a skilled person may readily infer from the schematic of FIG. 1, the piston of the implement 19 may be selectively moved in one of two directions by switching the control valve 22 to a corresponding spool position. By switching the control valve 22 to a neutral position in which the control valve 22 fluidly disconnects the implement 19 from the reservoir 20 and from the working pump 18, the piston of the implement 19 may be locked.

Through the accelerator pedal 15 and the joystick 16 an operator of the vehicle may enter one or more input commands which are then forwarded to the control unit 7. The control unit 7 includes one or more processors and is electrically connected to each of the valves 5*a-c*, 6*a-c*, 12*a-d* of the hydrostatic circuit 3, to the pump 8, the motor 9, the gearbox (not shown) between the motor 9 and the vehicle output 14, the engine 2, the splitter box 13 and the control valve 22. Only for matters of clarity the electric connection between the control unit 7 and the components controlled by the control unit 7 are not shown in FIG. 1. Based on the input commands from the accelerator pedal 15 and the joystick 16, the control unit 7 may control at least one of the valves 5*a-c*, 6*a-c*, 12*a-d* of the hydrostatic circuit 3, the displacement of the pump 8 and of the motor 9, a gear selection of the gearbox (not shown) between the motor 9 and the vehicle output 14, the engine 2, the splitter box 13 and the control valve 22. In particular the control unit 7 may turn the engine 2 on and off and may control the engine speed (measured in rpm). The control unit 7 may furthermore actuate the splitter box 13 to selectively drivingly engage the engine 2 with both pumps 8, 18 or with only one of the pumps 8, 18 at a time. In particular, the joystick 16 may be used to enter working hydraulics control commands and the accelerator pedal 15 may be used to enter traction commands.

The embodiment presented in this document describes a control strategy for the driveline 1 that, for a limited period in a cycle, such as a digging cycle, increases the available power of the front-end loader. The described solution/strategy analyzes the typical action performed during a Y cycle (see FIG. 2) and defines the optimal stages to connect the accumulators 4*a*, 4*b* for vehicle boosting or energy recovery during the execution of that particular duty cycle. Furthermore, a strategy for the management of the energy available in the accumulators 4*a*, 4*b* is presented.

Figure 2:
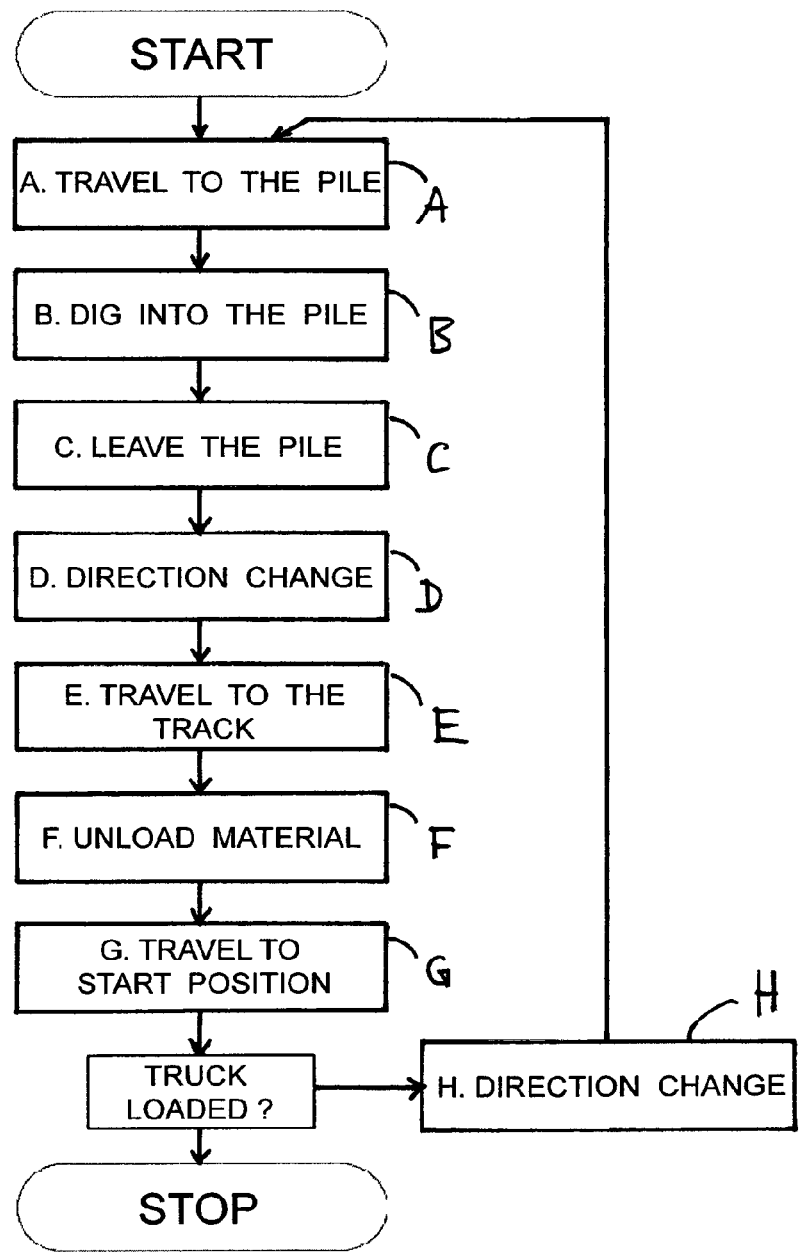
FIG. 2 a flow diagram of a work cycle of a working machine.

The flow diagram of FIG. 2 summarizes typical steps A-H carried out during a Y cycle. FIG. 3*a* shows time sequences of the total requested engine power 23 and the requested traction power 24 (the power requested at the output shaft of the motor 9) during the execution of the steps A-H outlined in FIG. 2. FIG. 3*b* shows a time sequence of a vehicle velocity 25 during the execution of the steps A-H of FIG. 2. Here and in the following, recurring features are designated by the same reference signs.

In FIG. 2, the vehicle is initially stationary at a starting position with an empty bucket. During a step A the vehicle travels from the starting position to a pile (of gravel, for example) with the empty bucket. FIG. 3*b* illustrates the increasing and then decreasing vehicle velocity as the vehicle accelerates to move towards the pile and subsequently decelerates as the vehicle approaches the pile. Similarly, FIG. 3*a* shows the corresponding total engine output power 23 and traction power 24 during step A.

During step B the vehicle digs into the pile. The necessary power is transmitted to both the vehicle output 14 through the hydrostatic circuit 3 and to the bucket through the working assembly 17. During step B the vehicle speed is low (see FIG. 3*b*), however the total requested engine power 23 and the requested traction power 24 are at their highest levels to drive the bucket into the pile.

During step C the vehicle moves rearward to the starting position, indicated by a negative speed in FIG. 3*b*. The bucket is filled during step C.

During step D the vehicle changes from rearward movement to forward movement to head towards the truck where the vehicle intends to unload the bucket. At the end of step D the vehicle has reached the starting position and is again stationary (zero speed).

During step E the vehicle moves toward the truck in the forward direction. Again, the vehicle accelerates as it leaves the starting position and subsequently decelerates as it approaches the truck. As the vehicle slows down and approaches the truck no or essentially no torque is requested at the traction output. However, the total requested engine power 23 is increased due to a driver command to lift the bucket above the loading space of the truck.

During step F the vehicle is stationary to unload the material from the bucket into the loading space of the truck. The power 24 requested at the traction output is zero or near zero. Again, the non-zero total requested engine power 23 is due to the handling of the lifting mechanism and the tipping mechanism during the process of unloading the bucket.

During step G the vehicle moves rearward to return to the starting position. Once the starting position is reached, the vehicle again changes direction to return to the pile (step H). The steps A-H are repeated until the truck is fully loaded.

Figure 3:
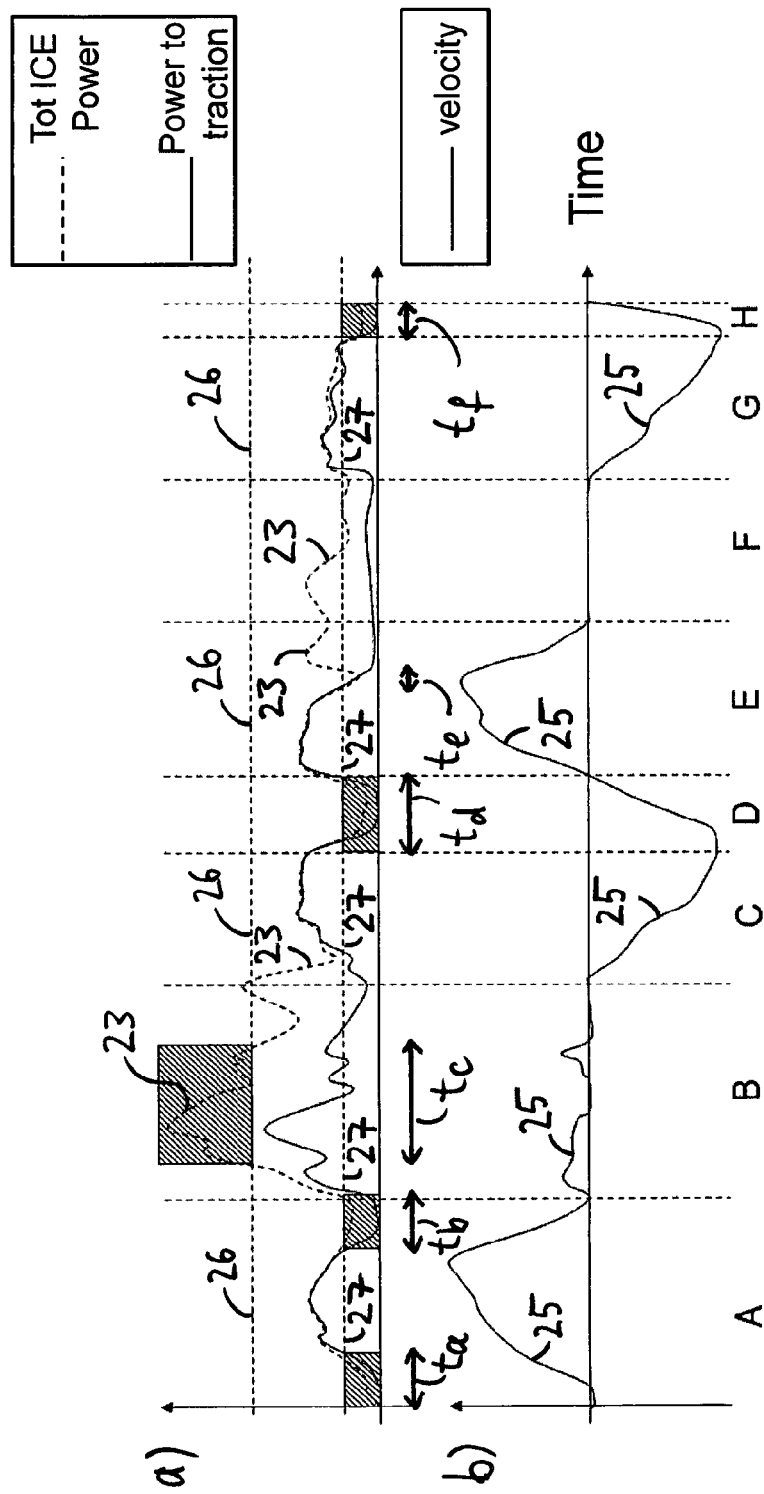
FIG. 3 time sequences of a total power request, a traction power request and a vehicle speed during the work cycle of FIG. 2.
Figure 4:
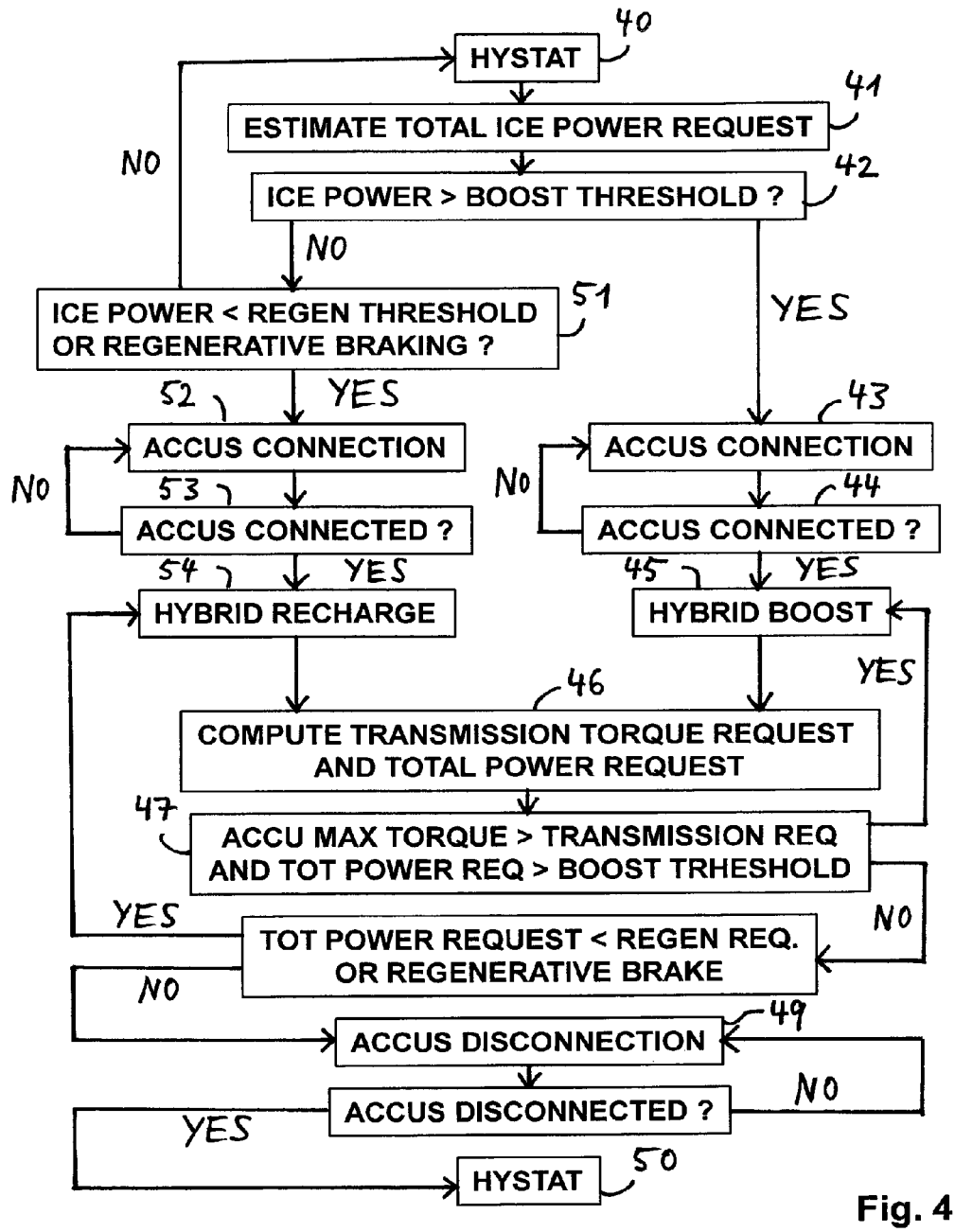
FIG. 4 a flow diagram of a control algorithm for controlling the driveline of FIG. 1 during the work cycle of FIG. 2.

A flow diagram showing the steps of the control procedure carried out by the control unit during the V-cycle shown in FIGS. 2 and 3 is schematically depicted in FIG. 4.

At 40 (see FIG. 4) the control unit 7 operates the vehicle in the hydrostatic mode. In the hydrostatic mode the accumulator valves 5a-c, 6a-c are closed, thereby fluidly disconnecting the accumulator assembly 4 from the hydrostatic circuit 3. Energy from the engine 2 is transmitted to the vehicle output 14 through the closed hydrostatic circuit 3. The control unit 7 sets the engine speed based on the input commands provided by the driver through the accelerator pedal 15 and possibly through the joystick 16. The control unit 7 further controls the displacement of the pump 8 based on the engine speed and controls the displacement of the motor 9 and the gear ratio based on the current vehicle speed.

At 41 (see FIG. 4), still in the hydrostatic mode, the control unit 7 continuously (e. g. at least once every 100 ms) computes the total power 23 requested from the engine 2 (see FIG. 3a) based on the input commands provided by the driver through the accelerator pedal 15 (and possibly through the joystick 16). The computation of the total requested power 23 is further based on the current vehicle speed and on a current gear ratio between the output shaft of the motor 9 and the vehicle output 14 (e. g. a vehicle axle).

FIG. 3a further depicts two dashed horizontal lines denoting a boost threshold power 26 and a recharge threshold power 27. The boost threshold power 26 corresponds to about 90 percent of the maximum output power that may be provided by the engine 2. That is, without resorting to additional power provided by the accumulator assembly 4, the total output power of the engine 2 could hardly be raised above the power level corresponding to the boost threshold 26. However, the control unit 7 is configured to identify the time periods during which the total power 23 requested from the engine 2 is close to or above the boost threshold 26 and to provide additional traction power during that period by fluidly connecting the accumulators 4a, 4b to the hydrostatic circuit 3.

Specifically, at 42 (see FIG. 4) the control unit 7 continuously (e. g. at least once every 100 ms) compares the computed total power 23 requested from the engine 2 to the boost threshold 26 (see FIG. 3a) and controls the accumulator valves 5a-c, 6a-c based on whether the total power 23 requested from the engine 2 is above or below the boost threshold 26.

In FIG. 3a, the total power 23 requested from the engine 2 is above the boost threshold 26 during a time span $t_c$ when the vehicle is digging into the pile. Once the control unit 7 detects that the total power request 23 is raised above the boost threshold 26, the control unit 7 actuates the accumulator valves 5a-c, 6a-c to change to the above described first open valve state, thereby fluidly connecting the accumulators 4a, 4b to the main lines 10, 11, respectively, as indicated at 43 in FIG. 4. At 44 one or more valve sensors electrically connected to the control unit 7 determine if the accumulator valves 5a-c, 6a-c are switched to the first open valve state. Once that is the case the control unit 7 switches to a hybrid boost mode, as indicated at 45 in FIG. 4.

Hydraulic fluid from the high pressure accumulator 4a is now displaced to the low pressure accumulator 4b through the motor 9, thereby adding torque to the motor 9 and to the vehicle output 14.

During the connection of the accumulators 4a, 4b to the hydrostatic circuit 3, that is during the time span $t_c$ in FIG. 3a, the control unit 7 continues to repeatedly (e. g. at least once every 100 ms) compute the total power 23 requested from the engine as explained above. Additionally, the control unit 7 repeatedly (e. g. at least once every 100 ms) computes a requested traction output torque based on the current accelerator pedal position, the current vehicle speed, a current direction of movement of the vehicle and the current gear ratio or gear selection between the motor 9 and the vehicle output 14 (e. g. a vehicle axle), as indicated at 46 in FIG. 4. The requested traction power 24 depicted in FIG. 3a is correlated to the requested traction output torque via the current vehicle speed and the current gear ratio.

At 47 in FIG. 4 and during the time span $t_c$ in FIG. 3a, the control unit 7 additionally continuously (e. g. at least once every 100 ms) computes a maximum torque $T_{acc,max}$ which the accumulators 4a, 4b may add at the motor 9 according to the relation $T_{acc,max}=a \cdot \Delta p \cdot \alpha$, where $\Delta p = p_{HP} - p_{LP}$ is the pressure difference between the hydraulic pressures in the accumulators 4a, 4b, $\alpha$ is the hydraulic displacement of the motor 9 (limited by the maximum displacement) and "a" is a system-dependent constant typically correlated to the efficiency of the motor 9 at maximum motor displacement.

Still at 47 in FIG. 4 and during the time span $t_c$ in FIG. 3a, the control unit 7 repeatedly (e. g. at least once every 100 ms) compares the torque requested at the traction output with the maximum torque $T_{acc,max}$ available through the accumulators 4a, 4b. As long as i) $T_{acc,max}$ is larger than the torque requested at the traction output and ii) the total power 23 requested from the engine 2 is above the boost threshold 26, the control unit 7 remains in the hybrid boost mode and actuates the accumulator valves 5a-c, 6a-c to keep the accumulators 4a, 4b connected to the hydrostatic circuit 3. That is, the steps 45, 46, 47 are continuously repeated. As long as the conditions i), ii) are met, the torque requested at the traction output may be provided through the accumulators 4a, 4b only. The engine 2 may be disengaged from the hydrostatic circuit 3 so that the hydrostatic circuit 3 absorbs no energy from the engine 2.

Therefore, as long as the accumulators 4a, 4b are connected and the above described conditions i), ii) are met, the control unit 7 commands the splitter box 13 to disengage the pump 8 from the engine 2 (see FIG. 1) and to engage the engine 2 with the working pump 18. In this configuration, all energy available from the engine 2 is transmitted to the working hydraulic assembly 17 to provide the full engine power at the bucket when digging into the pile. As an alternative to disengaging the engine 2 from the pump 8, the control unit 7 could fluidly disconnect the pump 8 from the accumulators 4a, 4b and from the motor 9 by closing the isolation valves 12a, 12b (see FIG. 1).

Once at least one of the conditions i), ii) is no longer satisfied, the control unit 7 actuates the accumulator valves 5a-c, 6a-c to change to the closed valve state, thereby disconnecting the accumulators 4a, 4b from the main lines 10, 11 of the hydrostatic circuit 3, as indicated at 49 in FIG. 4. During the Y-cycle of FIGS. 2 and 3 this is the case when the total power 23 requested from the engine 2 falls below the boost threshold 23 at the end of the time span $t_c$. Once the accumulator valves 5a-c, 6a-c have been fully switched to the closed valve state, the control unit 7 switches back to the hydrostatic mode, as indicated at 50 in FIG. 4.

During the hybrid boost mode (see the time span $t_c$ in FIG. 3a and reference signs 45, 46, 47 in FIG. 4) the control unit 7: controls the engine speed based on the input commands provided by the driver through the accelerator pedal 15 and through the joystick 16; controls the displacement of the pump 8 based on the engine speed; controls the displacement of the motor 9 based on the requested traction torque and based on $T_{acc,max}$; and controls the gear ratio based on the vehicle speed.

In order that enough hydraulic energy is stored in the accumulator assembly 4 to perform the above described hybrid boost operation during each of the Y-cycles described in FIGS. 2 and 3, the accumulator assembly 4 needs to be recharged during each cycle.

Since the proposed hybridization is on the transmission side, the power coming by the accumulators should preferably not exceed the requested traction power 24 (see FIG. 3a). Ideally, the hydraulic energy stored in the accumulators during each cycle should be equal to the hydraulic energy requested from the transmission during the hybrid boosting phase (see the time span $t_c$ in FIG. 3a and reference signs 45, 46, 47 in FIG. 4). In other words, during each cycle the amount of hydraulic energy $E_{boost}$ to be stored in the accumulator assembly 4, the amount of hydraulic energy recuperated through regenerative braking $E_{regen}$ and the amount of hydraulic energy $E_{ICE}$ gained through the above described procedure where the engine 2 drives the pump 8 to recharge the accumulators 4a, 4b, $E_{ICE}$ should satisfy the following condition: $E_{boost}+E_{losses}=E_{regen}+E_{ICE}$. If this condition is satisfied during each cycle, all the energy needed for traction may be provided through the accumulator assembly 4 and all power available from the engine 2 may be used for driving the working assembly 17.

During each cycle, the control unit 7 identifies the time periods during which the accumulators 4a, 4b may be fluidly connected to the hydrostatic circuit 3 for energy recuperation by means of the recharge threshold 27 depicted in FIG. 3a. If, at 42 in FIG. 4, the total power 23 requested from the engine is below the boost threshold 26, the control unit 7 continuously (for example at least once every 100 ms) compares the total power 23 requested from the engine 2 to the recharge threshold 27, as indicated at 51 in FIG. 4. As long as the total requested power 23 remains above the recharge threshold 27 and below the boost threshold 26, the steps 40, 41, 42, 51 are repeated.

Time periods $t_a$, $t_b$, $t_d$ $t_e$, $t_f$ during which the requested power 23 is below the recharge threshold power 27 (see FIG. 3a) may be used for a recuperation procedure. The recharge threshold power 27 is lower than the boost threshold power 26. For example, the recharge threshold power 27 may be chosen such that the engine 2 has enough capacity to provide additional power for energy recuperation.

Once the control unit 7 determines at 51 in FIG. 4 that the total requested power 23 is below the recharge threshold, the control unit actuates the accumulator valves 5a-c, 6a-c to connect the accumulators 4a, 4b to the hydrostatic circuit 3 for energy recuperation, as indicated at 52 in FIG. 4. When, at 53, the accumulators 4a, 4b are fully connected, the control unit 7 switches to the hybrid recuperation mode, as indicated at 54 in FIG. 4.

The hybrid recuperation mode may include regenerative braking and accumulator recharge through the engine 2 and the pump 8. Whether regenerative braking or accumulator recharge is carried out for energy recuperation may depend on the current vehicle speed and the input commands from the driver. For example, regenerative braking may only be performed when the driver commands the vehicle to decelerate. Otherwise, the control unit 7 may command the engine 2 to drive the pump 8 to displace hydraulic fluid from the low pressure accumulator 4b to the high pressure accumulator 4b, thereby recharging the accumulator assembly 4. During the hybrid recuperation mode the control unit 7 controls the displacement of the motor 9 based on the traction torque request. The control unit 7 controls the displacement of the pump 8 and the gear ratio based on the engine speed and the vehicle velocity, respectively. The control unit 7 may remain in the hybrid recuperation mode until the requested power 23 is raised above the recharge threshold.

The control unit 7 may further be configured to monitor the requested power 23 and the requested traction power 24 over one or more cycles and to adjust the boost threshold 26 and the recharge threshold 27 such that the above mentioned relation $E_{boost}+E_{losses}=E_{regen}+E_{ICE}$ is satisfied during each cycle. Such an estimate may well be possible with reasonable accuracy if the requested total power 23 and the requested traction power 24 follow a sufficiently similar course.

The control unit 7 combines the following properties: It is configured to recognize the connection and disconnection conditions of the accumulators 4a, 4b; it is configured to define methods for accumulator charging through the engine 2 and through kinetic energy recovery (regenerative braking); it is configured to define optimal strategies to manage connection/disconnection transients of the accumulators 4a, 4b; and it is configured to define optimal hydrostatic components actuations while the accumulators 4a, 4b are connected.

The invention claimed is:

1. A series hydraulic hybrid driveline for a vehicle, comprising:
    a power source;
    a hydraulic circuit comprising a first hydraulic displacement unit in fluid communication with a second hydraulic displacement unit, the first hydraulic displacement unit drivingly engaged or selectively drivingly engaged with the power source;
    at least one accumulator valve;
    a hydraulic accumulator assembly comprising a high pressure hydraulic accumulator and a low pressure hydraulic accumulator, the accumulator assembly selectively fluidly connected to the hydraulic circuit through the accumulator valve;
    at least one input device; and
    a control unit;
    wherein the control unit is configured to:
        compute, based on an input command from the input device, a total power requested from the power source;
        compare the computed total requested power to at least one threshold power; and
        control, based upon the result of the comparison, a valve state of the accumulator valve.

2. The series hydraulic hybrid driveline of claim 1, wherein the control unit is configured to repeatedly compute the requested power and to repeatedly compare the requested power to the threshold power.

3. The series hydraulic hybrid driveline of claim 1, wherein the input device includes at least one of an accelerator pedal and a brake and wherein the input command includes at least one of an acceleration command, a deceleration command and a brake command.

4. The series hydraulic hybrid driveline of claim 1, further including a working hydraulics assembly, wherein the input device includes a working hydraulics control device and the input command includes a working hydraulics control command.

5. The series hydraulic hybrid driveline of claim 1, wherein the threshold power includes a boost threshold and wherein the control unit is configured to change the valve state to an open state or keep the valve state in the open state when the computed power request is above the boost threshold or is increased above the boost threshold.

6. The series hydraulic hybrid driveline of claim 1, wherein the threshold power includes a recharge threshold and wherein the control unit is configured to change the valve state to an open state or keep the valve state in the open state when the computed power request is below the recharge threshold or falls below the recharge threshold.

7. The series hydraulic hybrid driveline of claim 6, wherein the control unit is configured to command the power source to drive the first hydraulic displacement unit so that the first hydraulic displacement unit displaces hydraulic fluid from the low pressure accumulator to the high pressure accumulator when the computed power request is below the recharge threshold or falls below the recharge threshold, thereby charging the accumulator assembly.

8. The series hydraulic hybrid driveline of claim 5, wherein the threshold power includes a recharge threshold and wherein the control unit is configured to change the valve state to an open state or keep the valve state in the open state when the computed power request is below the recharge threshold or falls below the recharge threshold.

9. The series hydraulic hybrid driveline of claim 8, wherein the control unit is configured to change the valve state to a closed state or keep the valve state in the closed state when the computed power request is below the boost threshold and above the recharge threshold.

10. The series hydraulic hybrid driveline claim 5, wherein the control unit is further configured to:
compute, based on the input command from the at least one input device and based on a vehicle status, a requested torque to be provided at an output of the second hydraulic displacement unit;
compute, based on a state of charge of the accumulator assembly, a maximum accumulator torque available through the accumulator assembly;
compare the requested torque to the maximum accumulator torque; and
change the valve state to the open state or keep the valve state in the open state when the computed power request is above or is increased above the boost threshold and the maximum accumulator torque is larger than the requested torque.

11. The series hydraulic hybrid driveline of claim 10, wherein the vehicle status includes at least one of a vehicle speed, a direction of movement of the vehicle and a gear selection.

12. The series hydraulic hybrid driveline of claim 10, wherein the control unit is configured to repeatedly compute the requested torque and the maximum accumulator torque and to repeatedly compare the requested torque to the maximum accumulator torque.

13. The series hydraulic hybrid driveline of claim 9, wherein the control unit is configured to disengage the first hydraulic displacement unit from the power source and to set a hydraulic displacement of the first hydraulic displacement unit to zero displacement so that no energy is transmitted from the power source to the second hydraulic displacement unit and the requested output torque is provided through the accumulator assembly, when the accumulator valve is in the open state, when the computed power request is above the boost threshold and when the maximum accumulator torque is larger than the requested torque.

14. The series hydraulic hybrid driveline of claim 9, wherein the control unit is configured to set a hydraulic displacement of the first hydraulic displacement unit to zero displacement so that no energy is transmitted from the power source to the second hydraulic displacement unit and the requested output torque is provided through the accumulator assembly, when the accumulator valve is in the open state, when the computed power request is above the boost threshold and when the maximum accumulator torque is larger than the requested torque.

15. The series hydraulic hybrid driveline of claim 4, wherein when the accumulator valve is in the open state, when the computed power request is above the boost threshold and when the maximum accumulator torque is larger than the requested torque, the control unit is further configured to command the power source to drive the working hydraulics assembly, so that all power provided by the power source is used for driving the working hydraulics assembly.

16. A method of controlling a series hydraulic hybrid driveline, the series hydraulic hybrid driveline comprising a power source; a hydraulic circuit comprising a first hydraulic displacement unit in fluid communication with a second hydraulic displacement unit, the first hydraulic displacement unit drivingly engaged or selectively drivingly engaged with the power source; at least one accumulator valve; a hydraulic accumulator assembly comprising a high pressure hydraulic accumulator and a low pressure hydraulic accumulator, the accumulator assembly selectively fluidly connected to the hydraulic circuit through the accumulator valve; at least one input device; and a control unit configured to compute a total power requested from the power source based on an input command from the input device, compare the computed total requested power to at least one threshold power, and control a valve state of the accumulator valve based upon the result of the comparison, the method at least comprising the steps of:
computing, based on an input command from the input device, a total power requested from the power source;
comparing the computed total requested power to the at least one threshold power; and
controlling, based upon the result of the comparison, a valve state of the accumulator valve.

* * * * *